Oct. 11, 1938.  G. F. MYERS  2,133,253

SPINNER COWLING

Original Filed April 4, 1934

Inventor:
George Francis Myers.

Patented Oct. 11, 1938

2,133,253

UNITED STATES PATENT OFFICE 2,133,253

SPINNER-COWLING

George Francis Myers, New York, N. Y.

Application April 4, 1934, Serial No. 718,893
Renewed January 3, 1938

6 Claims. (Cl. 244—53)

This invention relates to flying machines and especially to the cooling of the engines thereof.

It has for its object to produce a combined cowling and spinner giving plenty of cooling effect to the engine; also a spinner on the propeller provided with pivoted members; a spinner having a fan or impeller effect; a spinner with means for regulating the amount of air striking the motor; a revolving shutter or blade effect for cooling the motor.

With these and other objects in view the invention consists in the novel construction, combination and arrangement of parts as hereinafter fully described, illustrated and claimed.

Figure 1:
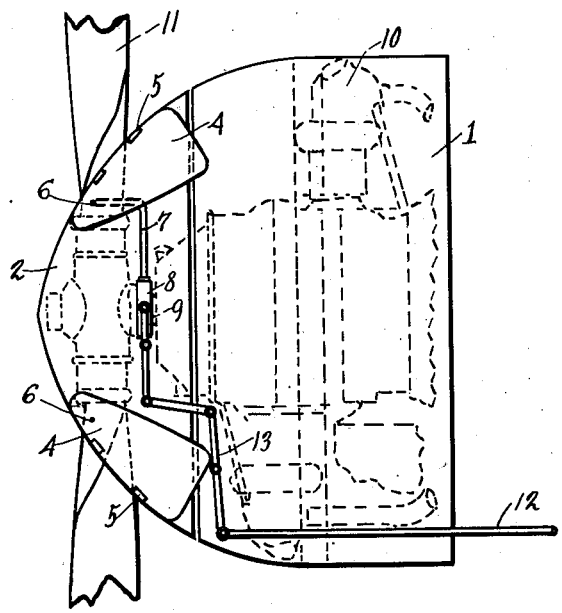
Figure 1 is a longitudinal cross section of the improved spinner and cowling with parts of a radial or multicylinder motor shown in dotted lines.
Figure 2:
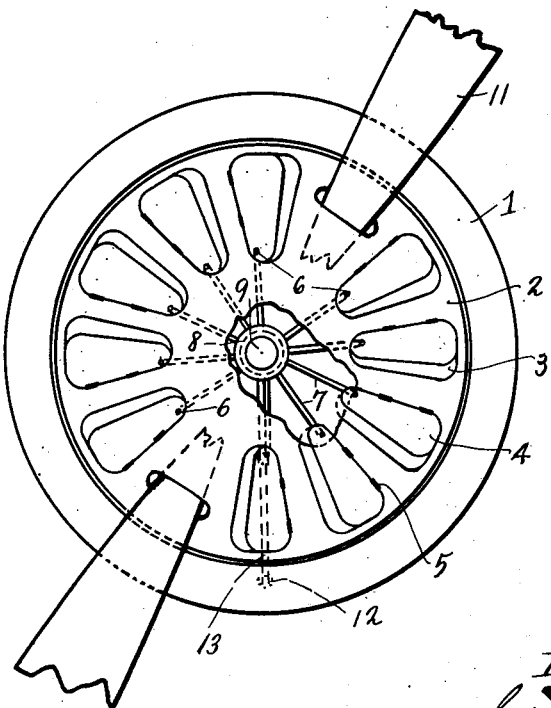
Fig. 2 is a front view of the spinner and cowling with the valves in the spinner part way open and with a portion of the spinner broken away and showing the interior thereof.

The invention is constructed and operated substantially and preferably as follows:

The cowling 1 may be of the usual construction, but the spinner 2 has a plurality of apertures 3 provided with covers, or valves, or vanes, or the like, 4, hinged as at 5, and connected at 6 by rods 7 to the shifter 8 placed around the shaft 9 of the motor 10 driving the blades 11, the shifter being operated by the rod 12 through an intermediate lever 13.

While the pilot is warming up his engine he sets the valves 4 of his spinner 2 in the open position, more or less so that the air will be blown thereby onto the cylinders of his engine in great volume in order to cool the same; but as he rises higher and higher and the atmosphere gradually gets colder, he of course does not need the same amount of this colder air to cool the engine so he pushes out the rod 12 thereby closing the said covers or blades or shutters. The spinner reaches almost to the cowling and the two will form an almost complete streamlined nose for the engine reducing the drag and therefore increasing the speed of the engine.

When an airplane starts on its preliminary run it receives the impinging air against its cylinders because they are exposed to the air more or less; but when the machine, especially one with a very high powered engine is being tried out with chocks against the wheels, or with brakes, the engine gets very hot if held in leash for any length of time. It is here that the impeller will be of great use and will cool the engine no matter how long it has to stand still.

As the invention in some of its aspects is generic, it is not limited to the particular construction shown or described, but I also contemplate the employment of such equivalents as fairly fall within the scope of the claims.

In this connection it should be stated that the flaps or hinged members, or revolving shutters or the like of the spinner may be so arranged as in an impeller that they push the air up even toward the inner periphery of the cowling so that the cylinders thereof may be kept cool when the flying machine is starting from the ground and has no, or very little forward motion, and consequently very little air is striking the heated portions of the cylinders, but by the manipulation of the vanes of the spinner in an appropriate manner the same may be made to act in the nature of a windmill, or blower, or impeller, or the like, and induce a great rush of air against the cylinders cooling the same, although there may be no impinging air due to speed or to the wind; when the machine reaches a great height where the air is cold and there is no need any more of cold air being thrown against the cylinders, the vanes, or valves, or covers, or the like are closed and form a streamlined nose, adding miles to the speed.

Therefore it will be understood that various changes may be made in the form, proportion, size and detail of the several structures shown and described, the number and position of the several elements used, as well as the character of the motive power required, without departing from the spirit of the invention.

I claim:

1. In a flying machine, a fuselage, an engine mounted on the fuselage and having a plurality of cylinders, a main stationary covering for the engine, a propeller having a hub and driven by the engine, a rotatable covering for the hub mounted contiguous to the first named covering and forming therewith a two-piece cone shaped covering extending from the rear of the cylinders to in front of the propeller and having large unobstructed radially triangularly shaped openings in the rotatable covering directly opposite the cylinders, movable triangularly shaped valves mounted radially at the openings and hinged to the rotatable covering and when open being close to the cylinders and for the greater part thereof lying between the propeller and the cylinders, and means for opening and closing the valves from the fuselage; the elements cooperating one with the other to let the outside air pass freely and unhindered through the openings directly against the front faces of the cylinders, to augment this movement of the outside air by positively forcing the same directly against the cylinders, and when desired enclosing the whole engine practically entirely against the action of the outside air during flight.

2. In a flying machine, an engine having a plurality of radial cylinders, a cowling mounted over the cylinders, a propeller driven by the engine and having a hub, a streamlined spinner having triangularly shaped openings therein mounted over the hub and rotating therewith, a plurality of movable triangularly shaped valves for covering the openings mounted in a circle around the same, hinges for the valves mounted on certain portions of the surface of the spinner and so set thereon that the valves will impel the air directly against the front faces of the cylinders, there being an unobstructed space between the valves and the cylinders, and means for opening the valves whereby the cylinders will be cooled by the impelled air striking the same when the machine is standing on the ground there being no impinging air striking the cylinders at this time; but when the machine is flying through the air the cylinders will be washed by both the impelled air and the impinging air striking against them due to speed through the air, the valves being open and rotating; and when the machine is travelling in the colder atmosphere the valves will be closed and the spinner and cowling will present a streamlined housing from end to end; all of the above mentioned changes being chosen at will by the operator during flight.

3. The combination in a flying machine, of a fuselage, an engine mounted on the fuselage, a propeller driven by the engine and having a hub, a spinner for the propeller covering the hub thereof and turning therewith, a plurality of hinged valves mounted radially in a circle on the spinner between the engine and the propeller and opening wholly inside the same and turning therewith, and means connected to the valves and reaching rearwardly for operating the valves from the fuselage.

4. The combination in a flying machine, of a fuselage, an engine mounted on the fuselage, a propeller driven by the engine and having a hub, a spinner for the propeller covering the hub thereof and turning therewith, a plurality of valves mounted on the spinner and moveable thereon between the engine and the propeller and opening for the most part inside the same and turning therewith, and means connected to the valves and reaching rearwardly for operating the valves from the fuselage.

5. In a flying machine, a fuselage, an engine mounted on the fuselage and having a plurality of cylinders, a main stationary covering for the engine, a propeller having a hub and driven by the engine, a rotatable covering for the hub mounted contiguous to the first named covering and forming therewith a two piece cone shaped covering extending from the rear of the cylinders to in front of the propeller and having large unobstructed openings in the rotating covering directly opposite the cylinders, movable valves mounted at the openings and hinged to the rotatable covering and when open being close to the cylinders and for the greater part thereof lying between the propeller and the cylinders, and means for opening and closing the valves from the fuselage; the elements co-operating one with the other to let the outside air pass freely and unhindered through the openings directly against the front faces of the cylinders, to augment this movement of the outside air by positively forcing the same directly against the cylinders, and when desired enclosing the whole engine practically entirely against the action of the outside air during flight.

6. In a flying machine, an engine having a plurality of cylinders, a cowling mounted over the cylinders, a propeller driven by the engine and having a hub, a streamlined spinner having openings therein covering the hub and rotating therewith, a plurality of valves covering the opening, and means for opening the valves, whereby the cylinders will be cooled by the impelled air from the rotating valves striking the cylinders when the machine is standing on the ground and there is no impinging air striking the cylinders at this time; but when the machine is flying through the air the cylinders will be washed by both the impelled air and the impinging air striking against them due to the speed of the machine through the air, the valves being open and rotating; and when the machine is traveling in the colder atmosphere the valves will be closed and the spinner and cowling will present a streamlined housing from end to end; all the above mentioned changes being chosen at will by the operator during flight.

GEORGE FRANCIS MYERS.